(12) United States Patent
Tsuzaki et al.

(10) Patent No.: US 10,471,863 B2
(45) Date of Patent: Nov. 12, 2019

(54) VEHICLE SEAT

(71) Applicant: TOYOTA BOSHOKU KABUSHIKI KAISHA, Aichi (JP)

(72) Inventors: Atsushi Tsuzaki, Aichi (JP); Hiroshi Murahata, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 110 days.

(21) Appl. No.: 15/730,798

(22) Filed: Oct. 12, 2017

(65) Prior Publication Data

US 2018/0105083 A1 Apr. 19, 2018

(30) Foreign Application Priority Data

Oct. 14, 2016 (JP) .................................. 2016-202504

(51) Int. Cl.
*B60N 2/56* (2006.01)
*B60N 2/90* (2018.01)

(52) U.S. Cl.
CPC ........... *B60N 2/565* (2013.01); *B60N 2/5621* (2013.01); *B60N 2/5657* (2013.01); *B60N 2002/924* (2018.02)

(58) Field of Classification Search
CPC .. B60N 2/5621; B60N 2/5628; B60N 2/5635; B60N 2/5642; B60N 2/565; B60N 2/5657
See application file for complete search history.

(56) References Cited

U.S. PATENT DOCUMENTS

| | | | |
|---|---|---|---|
| 7,261,372 B2 * | 8/2007 | Aoki .................... | B60N 2/5635 297/180.13 |
| 2012/0144844 A1 * | 6/2012 | Park .................... | B60N 2/5692 62/3.3 |
| 2013/0264857 A1 * | 10/2013 | Ota ...................... | B60N 2/5657 297/452.47 |
| 2017/0028875 A1 * | 2/2017 | Masuda ................. | B60N 2/62 |
| 2017/0036575 A1 * | 2/2017 | Kobayashi ............. | B60N 2/68 |
| 2017/0080837 A1 * | 3/2017 | Cho .................... | B60N 2/5628 |
| 2018/0111526 A1 * | 4/2018 | Okimura ............... | B60N 2/90 |
| 2019/0135145 A1 * | 5/2019 | Zhang .................. | B60N 2/5621 |
| 2019/0176663 A1 * | 6/2019 | Hoshi .................. | B60N 2/5657 |

FOREIGN PATENT DOCUMENTS

| | | | | |
|---|---|---|---|---|
| JP | 2013124000 A | * | 6/2013 | .......... B60N 2/5621 |
| JP | 5573827 | | 8/2014 | |
| JP | 2016-55783 | | 4/2016 | |

* cited by examiner

*Primary Examiner* — Timothy J Brindley
(74) *Attorney, Agent, or Firm* — Greenblum & Bernstein, P.L.C.

(57) ABSTRACT

A vehicle seat is provided. The vehicle seat comprises a seat body, a fan, a duct, a mounting bracket, and a holder. The fan blows air out or draws air in. The duct couples between the seat body and the fan, and is flexible. The mounting bracket is to be mounted to a panel provided in the seat body and supports the duct. The holder is provided in at least a first one of the duct and the mounting bracket. The holder is configured to be abutted against a second one of the duct and the mounting bracket in a state where the mounting bracket is not mounted to the panel, thereby holding a mounting surface of the mounting bracket and a mounting surface of the panel such that the mounting surface of the mounting bracket and the mounting surface of the panel are approximately parallel to each other.

7 Claims, 8 Drawing Sheets

VEHICLE SEAT

CROSS-REFERENCE TO RELATED APPLICATIONS

This application claims the benefit of Japanese Patent Application No. 2016-202504 filed on Oct. 14, 2016 with the Japan Patent Office, and the disclosure of which is incorporated herein by reference.

BACKGROUND

The present disclosure relates to a vehicle seat.

As disclosed in Japanese Unexamined Patent Application Publication No. 2016-55783, a seat cushion to which an air conditioning device is attached has been known. The air conditioning device comprises a fan, a duct, etc. The duct couples the fan to a ventilation passage formed in the seat cushion.

SUMMARY

As a method for attaching the air conditioning device to the seat cushion, it has been considered to support the duct by a mounting bracket and to mount this mounting bracket to a panel provided in the seat cushion.

In order to attach the air conditioning device by using this method, when the air conditioning device is placed at an attachment position, a large angle may be formed between a mounting surface of the mounting bracket and a mounting surface of the panel. In this case, the work for mounting the mounting bracket to the panel is difficult.

It is desirable in one aspect of the present disclosure to provide a vehicle seat that can facilitate the work for mounting the mounting bracket to the panel.

One mode of the present disclosure is a vehicle seat that comprises a seat body, a fan, a duct, a mounting bracket, and a holder. The fan is configured to blow air out or draw air in. The duct is configured to couple between the seat body and the fan. The mounting bracket is configured to be mounted to a panel provided in the seat body and configured to support the duct. The holder is provided in at least a first one of the duct and the mounting bracket. The holder is configured to be abutted against a second one of the duct and the mounting bracket in a state where the mounting bracket is not mounted to the panel, thereby holding a mounting surface of the mounting bracket and a mounting surface of the panel such that the mounting surface of the mounting bracket and the mounting surface of the panel are approximately parallel to each other.

In the vehicle seat of the present disclosure, in the state where the mounting bracket is not mounted to the panel, the holder holds the mounting surface of the mounting bracket and the mounting surface of the panel such that the mounting surface of the mounting bracket and the mounting surface of the panel are approximately parallel to each other. Thus, the work for mounting the mounting bracket to the panel can be facilitated. The duct may be flexible.

The vehicle seat of the present disclosure may further comprise, for example, the following Configuration 1.
[Configuration 1]
The holder is a part of the duct.

When the vehicle seat of the present disclosure further comprises the aforementioned Configuration 1, damage to the holder can be inhibited by the second one of the duct and the mounting bracket.

The vehicle seat of the present disclosure may further comprise, for example, the following Configuration 2.
[Configuration 2]
The mounting bracket is rotatably mounted to the fan via a rotating shaft, and the holder is provided at a side opposite to the rotating shaft when viewed from the duct.

When the vehicle seat of the present disclosure further comprises the aforementioned Configuration 2, the holder is located at the side opposite to the rotating shaft when viewed from the duct. Thus, a greater distance exists between the holder and the rotating shaft. Consequently, the holder achieves further accurate adjustment of the angle formed between the mounting surface of the mounting bracket and the mounting surface of the panel.

The vehicle seat of the present disclosure may further comprise, for example, the following Configuration 3.
[Configuration 3]
The holder comprises at least one protrusion on a surface to be abutted against the second one of the duct and the mounting bracket.

When the vehicle seat of the present disclosure further comprises the aforementioned Configuration 3, an operator can easily confirm whether a position of the holder with respect to the second one of the duct and the mounting bracket is appropriate based on a position of the at least one protrusion with respect to the aforementioned second one.

The vehicle seat of the present disclosure may further comprise, for example, the following Configuration 4.
[Configuration 4]
At least a part of a surface of the holder that is to be abutted against the second one of the duct and the mounting bracket is a flat surface.

When the vehicle seat of the present disclosure further comprises the aforementioned Configuration 4, the holder can further securely hold the second one of the duct and the mounting bracket.

BRIEF DESCRIPTION OF THE DRAWINGS

Example embodiments of the present disclosure will be described hereinafter by way of example with reference to the accompanying drawings, in which.

DETAILED DESCRIPTION OF THE PREFERRED EMBODIMENTS

First Embodiment

Figure 1:
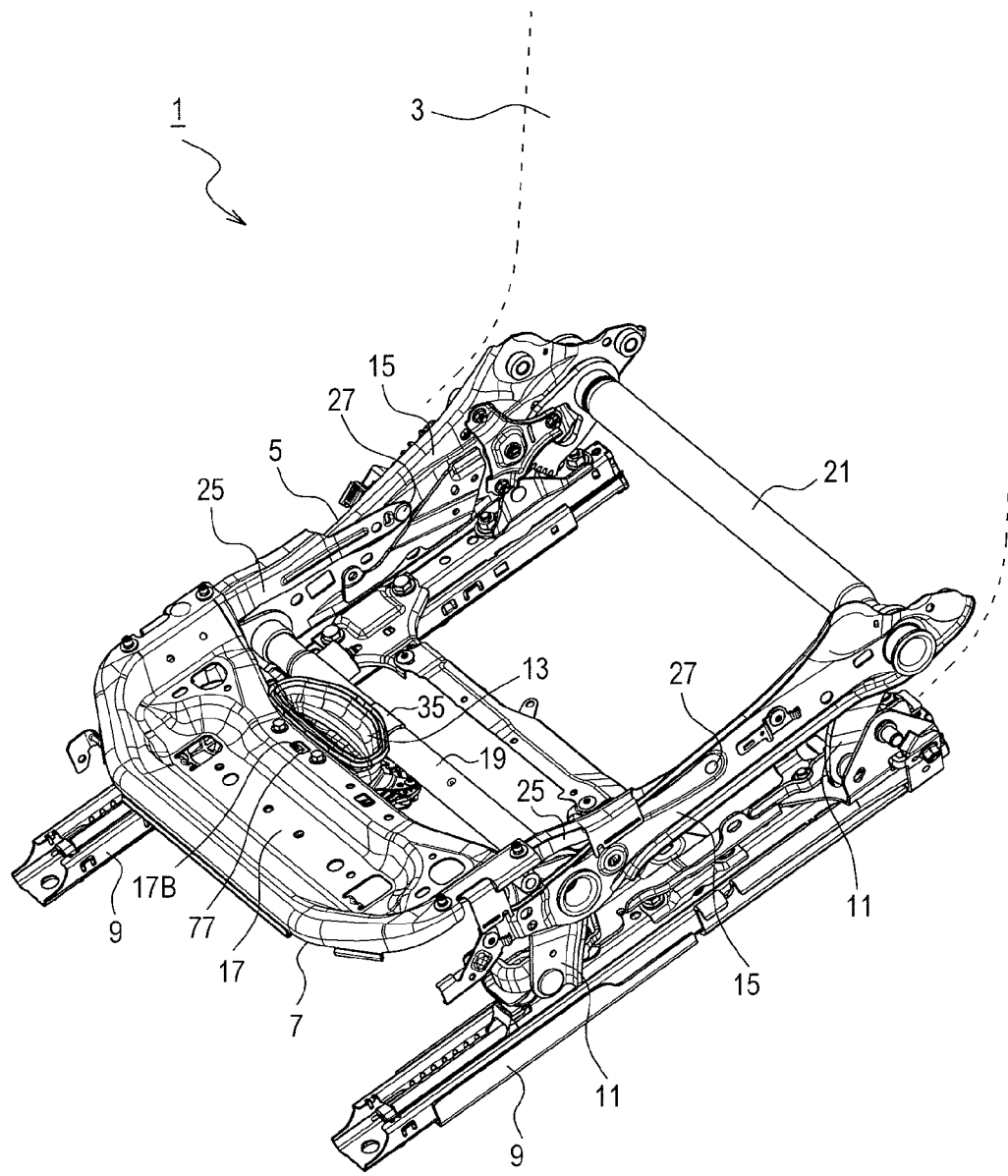
FIG. 1 is a perspective view showing a configuration of a vehicle seat.

1. Configuration of Vehicle Seat 1
(1) Overall Configuration of Vehicle Seat 1
With reference to FIGS. 1 and 2, an overall configuration of a vehicle seat 1 will be described. The vehicle seat 1 is a seat for an automobile. In the following descriptions, unless otherwise specifically stated, "front" refers to a front of a vehicle seat and an automobile, and "rear" refers to a rear of the vehicle seat and the automobile. The vehicle seat 1 comprises a seatback 3 to be used as a backrest for an occupant, and a seat cushion 5 to be used as a seating portion. The seat cushion 5 corresponds to one example of a seat body.

The vehicle seat 1 comprises a front tilt mechanism 7 that is electrically operated. The front tilt mechanism 7 changes an angle of the seat cushion 5. Details of the front tilt mechanism 7 will be described later.

The vehicle seat 1 can change an angle of the seatback 3. The vehicle seat 1 comprises two slide rails 9 on a floor of the automobile. The seat cushion 5 is coupled to the slide rails 9. The seat cushion 5 is movable in a front-rear direction by sliding operations of the slide rails 9.

The vehicle seat 1 comprises a seat lifter 11 between the seat cushion 5 and the slide rails 9. The seat cushion 5 is movable in an up-down direction by operation of the seat lifter 11.

The vehicle seat 1 comprises an air conditioning device 13 in a region below the seat cushion 5. The air conditioning device 13 draws air in from an area where the seat cushion 5 is provided. Because of this drawing-in of the air, by the air conditioning device 13, from the area where the seat cushion 5 is provided, the seat cushion 5 is inhibited from getting soggy. A configuration of the air conditioning device 13 will be described later.

(2) Configuration of Seat Cushion 5

Figure 2:
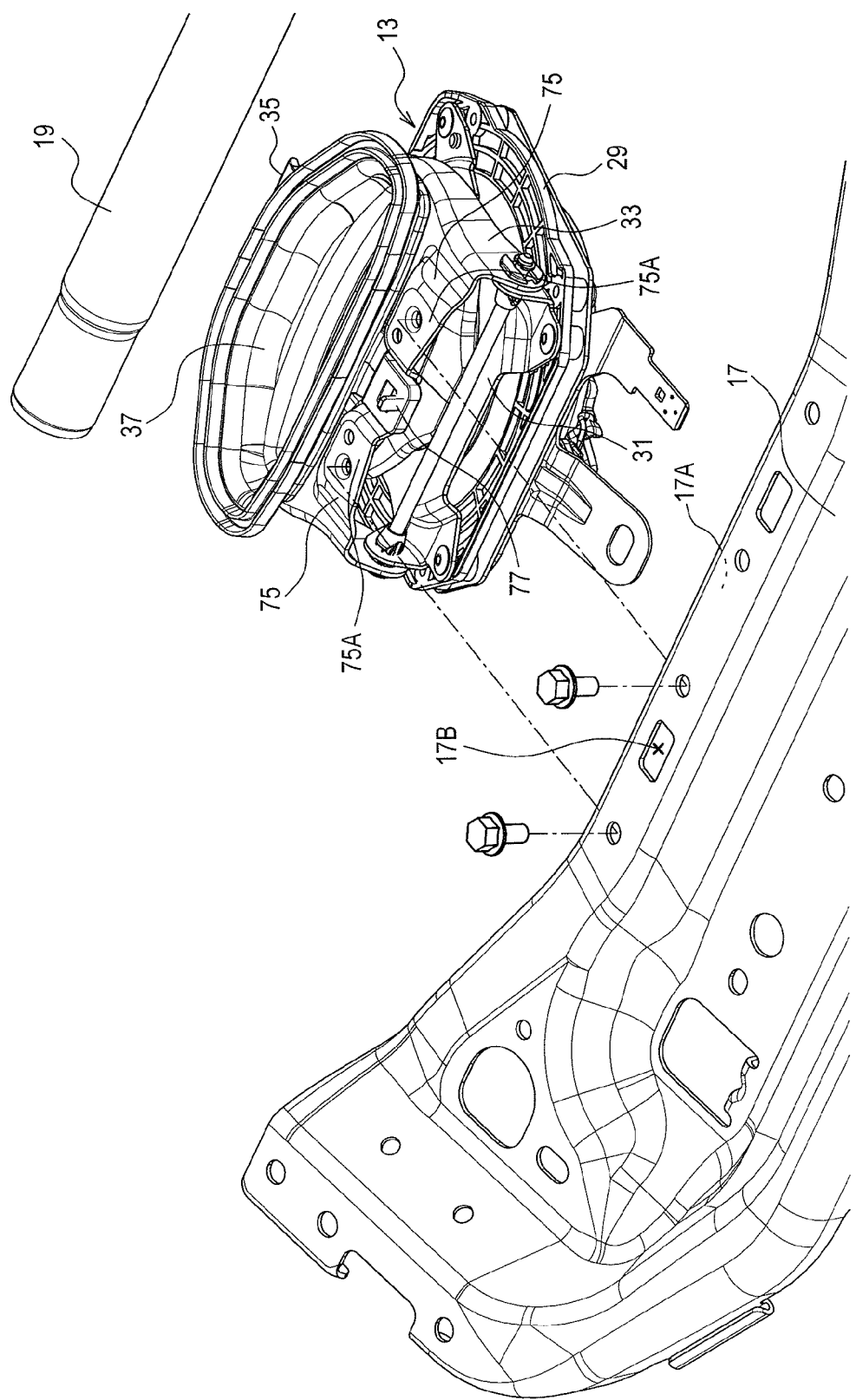
FIG. 2 is an exploded perspective view showing a mounting position for an air conditioning device.

With reference to FIGS. 1 and 2, a configuration of the seat cushion 5 will be described. The seat cushion 5 comprises two side frames 15, a front panel 17, a front pipe 19, a rear pipe 21, two tilt arms 25, and a rotation shaft 27. The front panel 17 corresponds to one example of a panel provided in the seat body.

The front panel 17 bridges respective front ends of the two side frames 15. The front panel 17 supports an occupant's thigh from underneath.

Each of the front pipe 19 and the rear pipe 21 is a round pipe made of metal. Each of the front pipe 19 and the rear pipe 21 bridges the two side frames 15. The front pipe 19 is located rearward of the front panel 17. The rear pipe 21 is located rearward of the front pipe 19 and bridges respective end portions of the two side frames 15.

One of the two tilt arms 25 extends rearward from a left end of the front panel 17, and the other of the two tilt arms 25 extends rearward from a right end of the front panel 17. The rotation shaft 27 couples respective rear ends of the two tilt arms 25 to the two side frames 15 such that the rear ends of the two tilt arms 25 are rotatable. The front panel 17 and the two tilt arms 25 are rotatable about the rotation shaft 27. As a result of the rotation of the front panel 17 and the two tilt arms 25, the angle of the seat cushion 5 is changed. The front panel 17, the two tilt arms 25, and the rotation shaft 27 form the front tilt mechanism 7. The front tilt mechanism 7 further comprises a drive unit (not shown) that rotatably drives the front panel 17 and the two tilt arms 25.

(3) Configuration of Air Conditioning Device 13

Figure 3:
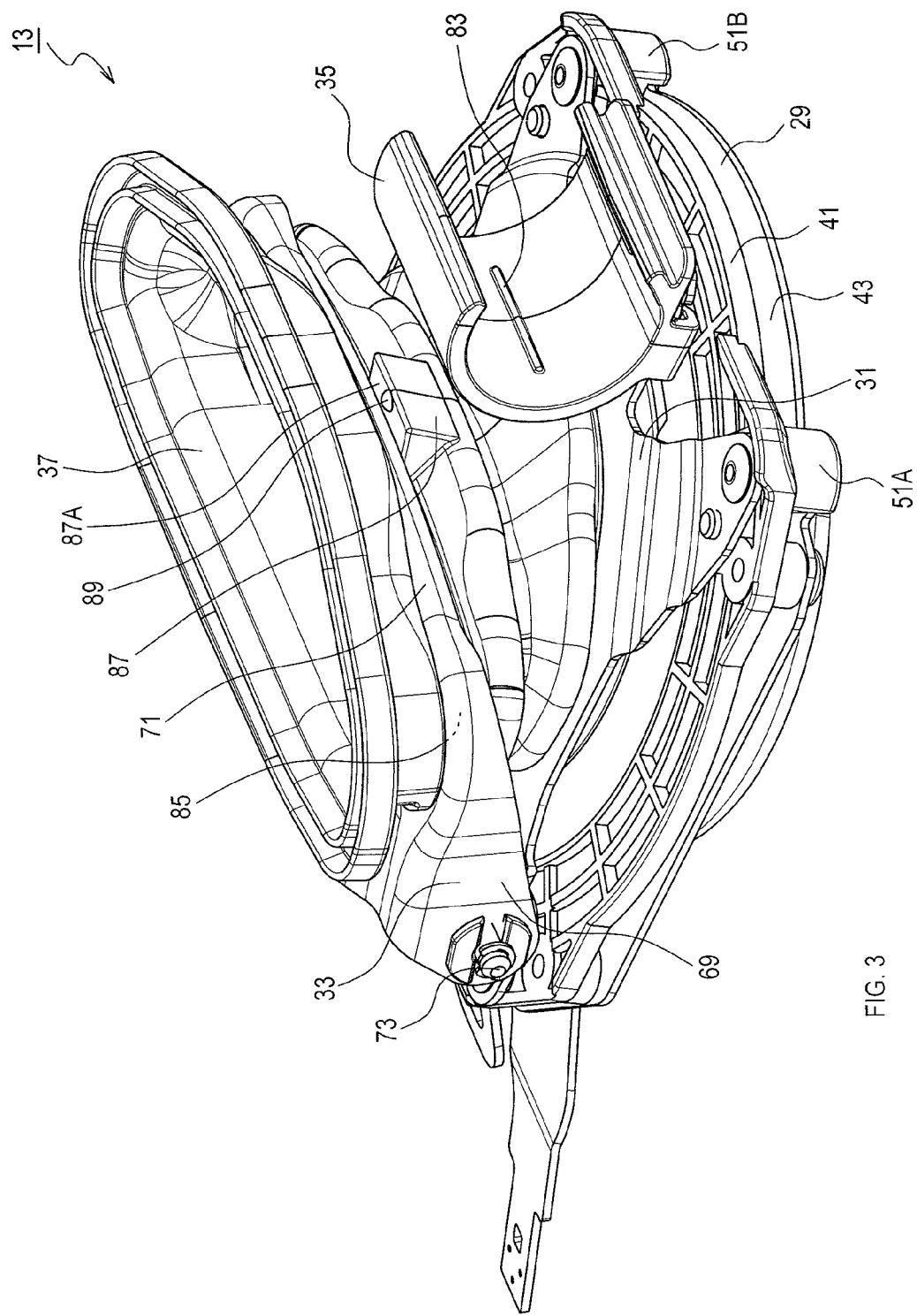
FIG. 3 is a perspective view showing a configuration of the air conditioning device.
Figure 4:
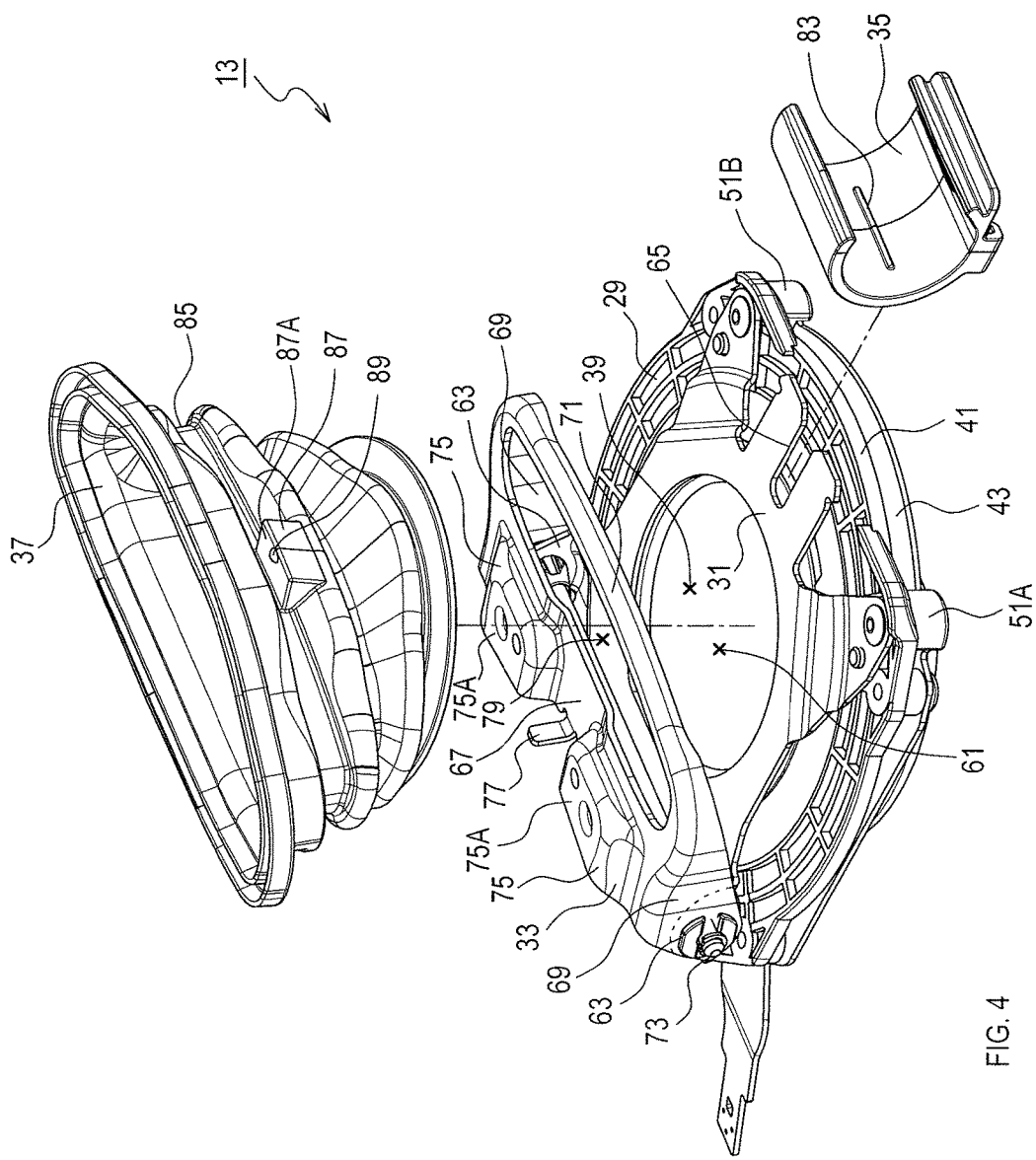
FIG. 4 is an exploded perspective view showing the configuration of the air conditioning device.
Figure 5:
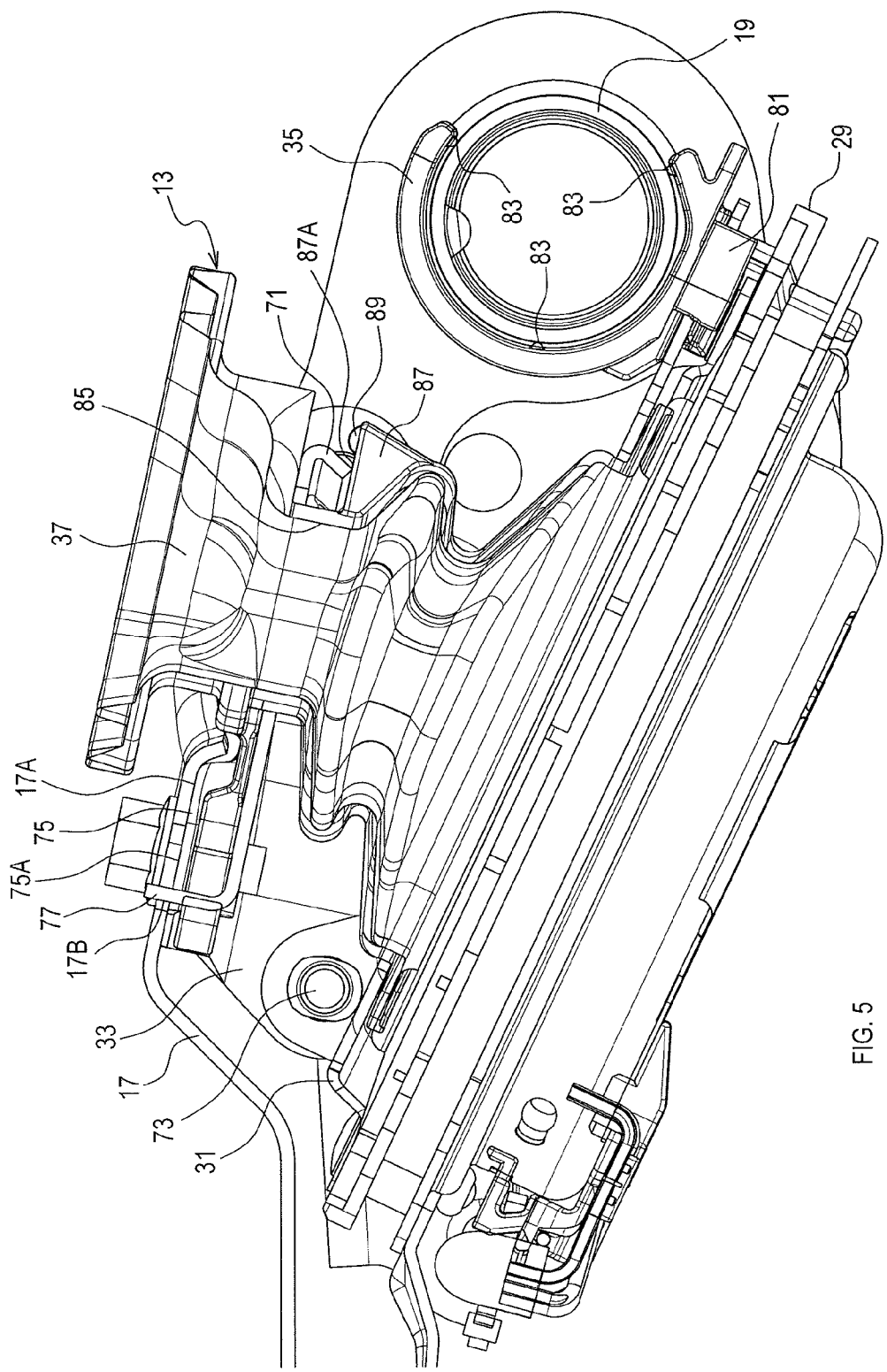
FIG. 5 is a side sectional view showing the air conditioning device and its peripheral members.

With reference to FIGS. 2 to 8, a configuration of the air conditioning device 13 will be described. As shown in FIGS. 3 to 5, the air conditioning device 13 comprises a fan 29, a mounting plate 31, a mounting bracket 33, a hook 35, and a duct 37.

Figure 7:
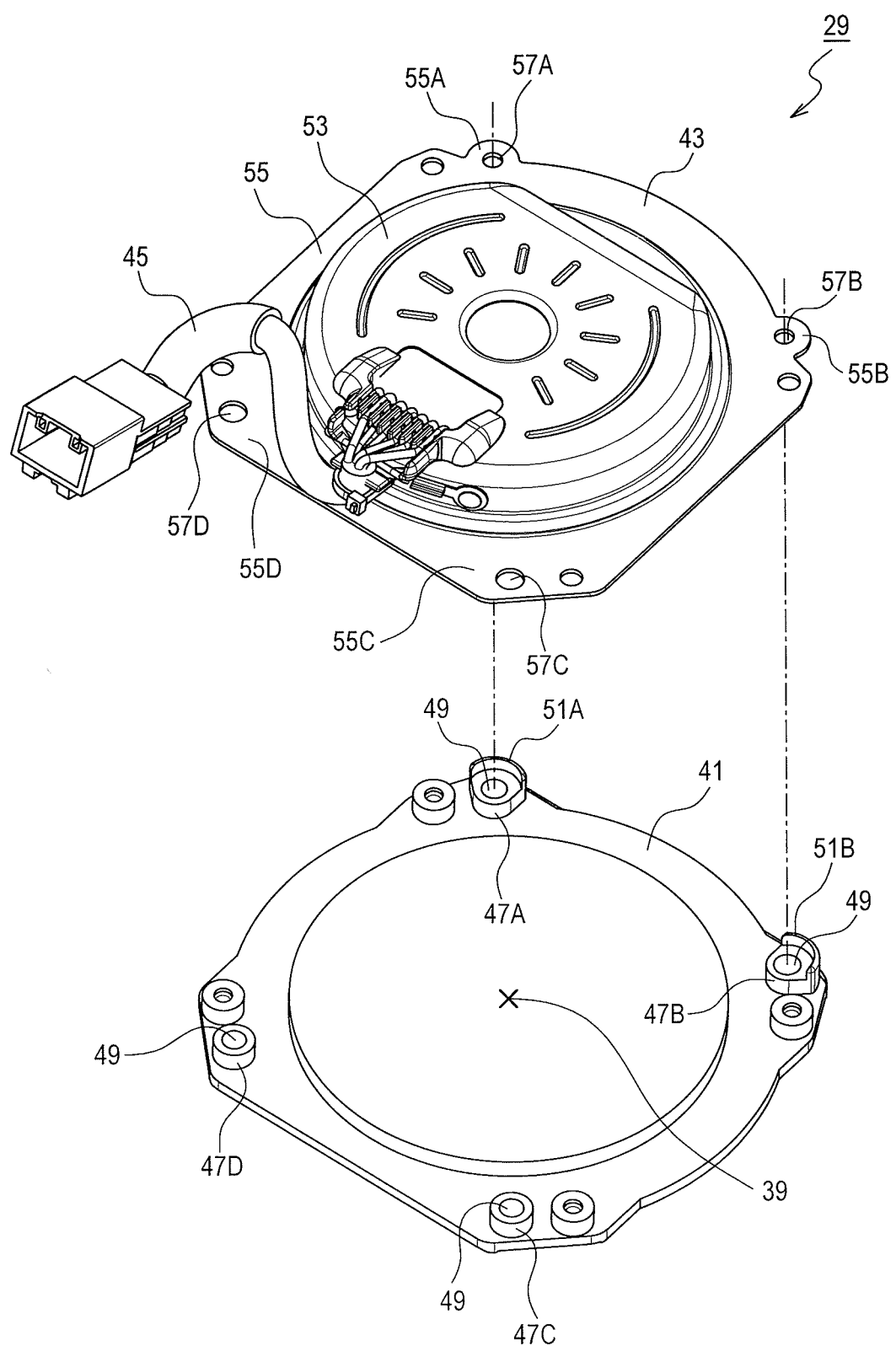
FIG. 7 is an exploded perspective view showing the configuration of the fan.

As shown in FIGS. 4 and 7, the fan 29 comprises a vent hole 39 on an upper surface thereof. The fan 29 can draw air in through the vent hole 39. The fan 29 may be configured to blow air out through the vent hole 39. The fan 29 may have a function of heating or cooling air.

Figure 6:
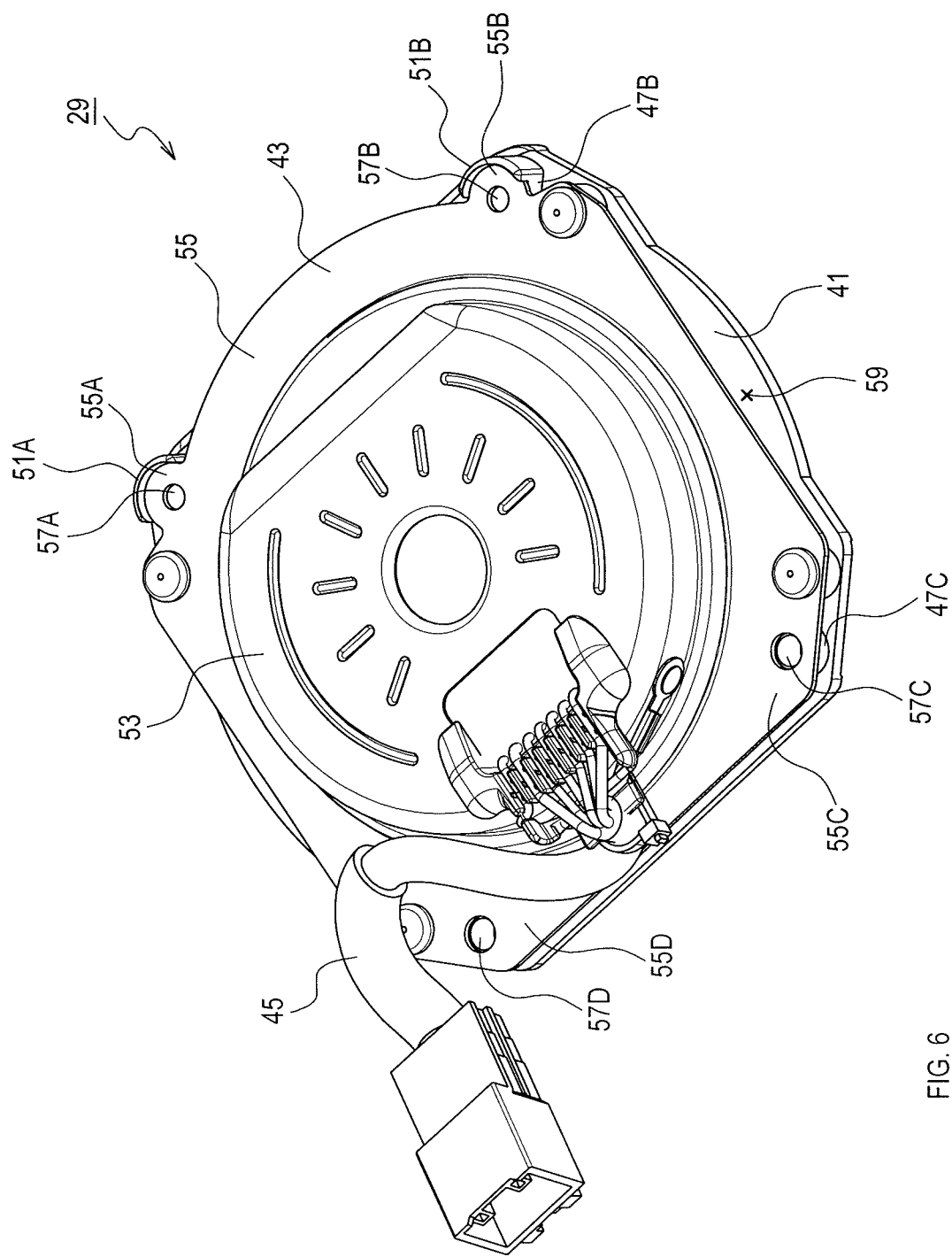
FIG. 6 is a perspective view showing a configuration of a fan.
Figure 8:
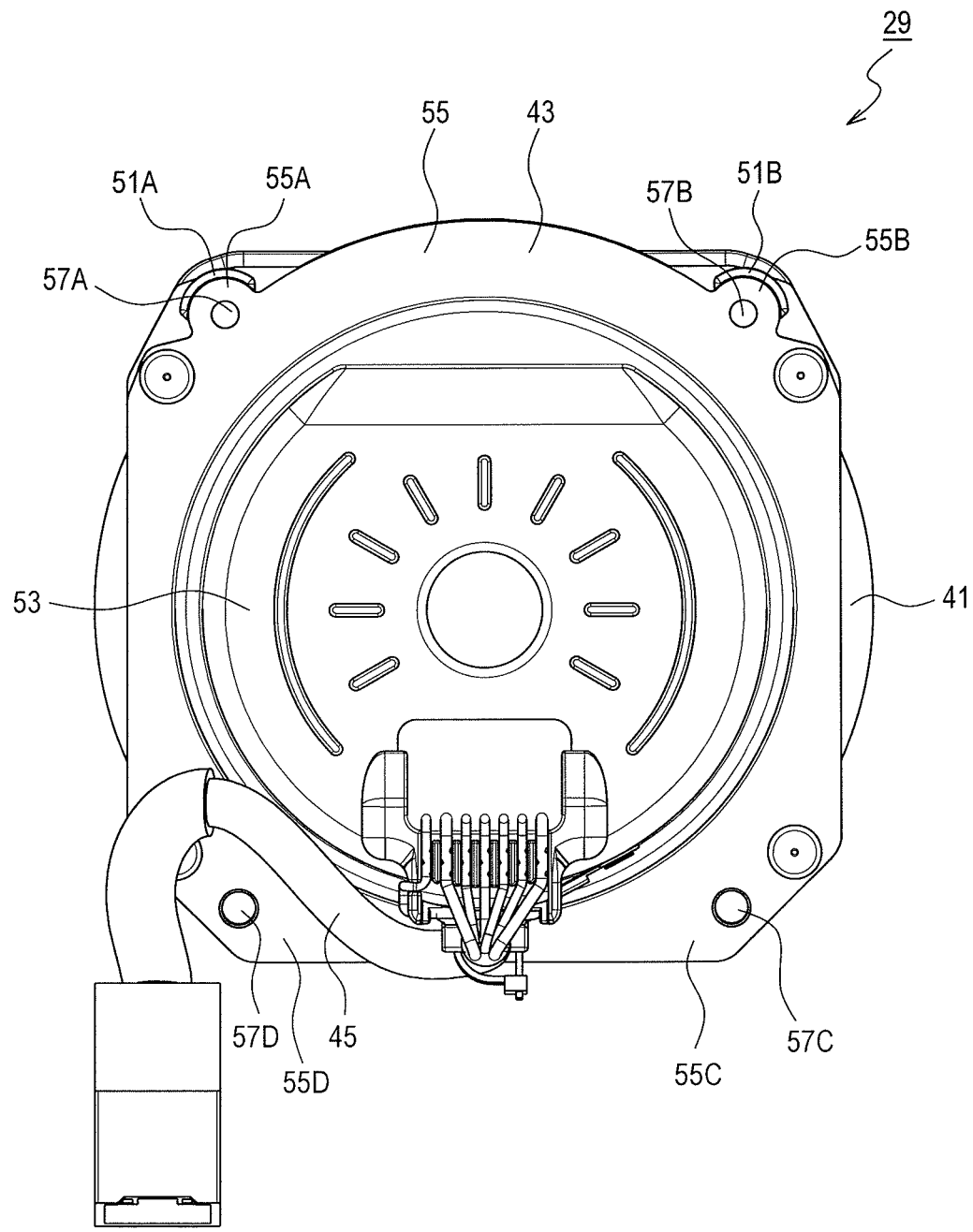
FIG. 8 is a plan view showing the configuration of the fan.

As shown in FIGS. 6 to 8, the fan 29 comprises an upper case 41, a lower case 43, a harness 45, and an air blowing mechanism; the air blowing mechanism is not shown in the figures.

The upper case 41 is assembled to the lower case 43, thereby forming a case module of the fan 29. The aforementioned air blowing mechanism is housed in the case module of the fan 29. When viewed in a plan view, the upper case 41 has an approximately rectangular shape. The upper case 41 has a flat plate-like shape. The upper case 41 is located in an upper side of the fan 29 (that is, the side close to the seat cushion 5). The above-described vent hole 39 is formed in a central area of the upper case 41.

As shown in FIG. 7, the upper case 41 comprises seatings 47A, 47B, 47C, 47D, respectively, on four corners of the upper case 41. Each of the seatings 47A, 47B, 47C, 47D has a columnar shape and protrudes towards the lower case 43. When viewed in a plan view, the seatings 47A, 47B, 47C, 47D are disposed to be located at respective four vertices of a square. A screw hole 49 is provided in each of the seatings 47A, 47B, 47C, 47D.

An outer circumferential portion of the seating 47A has a distal section that is distal to a center of the upper case 41 (i.e., the section located at an outer side of the fan 29). In this distal section, a rib 51A having an arc shape is provided. Likewise, in such distal section of an outer circumferential portion of the seating 47B, a rib 51B having an arc shape is provided. Heights of the ribs 51A, 51B are higher than heights of the seatings 47A, 47B. No rib is provided in an outer circumferential portion of each of the seatings 47C, 47D. A material of the upper case 41 including the ribs 51A, 51B is resin. Each of the ribs 51A, 51B comprises a contact surface to be in contact with the harness 45.

When viewed in a plan view, the lower case 43 has an approximately rectangular shape. The lower case 43 is located in a lower side of the fan 29 (that is, the side opposite to a side where the seat cushion 5 is provided). The lower case 43 comprises a central portion 53 formed in an approximately cylindrical shape and a flat portion 55 disposed around the central portion 53.

On the flat portion 55, screw through holes 57A, 57B, 57C, 57D are formed at positions corresponding to four corners of the lower case 43. The positions of the screw through holes 57A, 57B, 57C, 57D are specified such that in a case where the upper case 41 and the lower case 43 are assembled to each other, when viewed in a plan view, the screw through hole 57A overlies the seating 47A, the screw through hole 57B overlies the seating 47B, the screw through hole 57C overlies the seating 47C, and the screw through hole 57D overlies the seating 47D.

As shown in FIGS. 6 and 8, the flat portion 55 comprises outer peripheral sections 55A, 55B located in the vicinity of the screw through holes 57A, 57B, respectively. Each of the outer peripheral sections 55A, 55B is formed in a shape of an arc-shaped cutout, so that the ribs 51A, 51B do not abut the flat portion 55 when the upper case 41 and the lower case 43 are assembled to each other.

Accordingly, when an orientation of the lower case 43 with respect to the upper case 41 is an orientation shown in FIGS. 6 and 8 (hereinafter, referred to as "normal orientation"), the upper case 41 and the lower case 43 can be assembled to each other. The harness 45 is routed in respective rear regions of the upper case 41 and the lower case 43. When the orientation of the lower case 43 with respect to the upper case 41 is the normal orientation, the harness 45 can be coupled to other harnesses (not shown).

The flat portion 55 comprises outer peripheral sections 55C, 55D located in the vicinity of the screw through holes 57C, 57D, respectively. The outer peripheral sections 55C, 55D, however, do not have the aforementioned shape of an arc-shaped cutout. Accordingly, if the lower case 43 is rotated by 180 degrees from the orientation shown in FIG. 8 and then, assembled to the upper case 41, such an assembling cannot be achieved; this is because the ribs 51A and 51B abut, respectively, the outer peripheral sections 55C and 55D before the lower case 43 sufficiently comes close to the upper case 41.

That is to say, when the orientation of the lower case 43 with respect to the upper case 41 is different from the normal orientation, the assembling of the lower case 43 to the upper case 41 is restricted by the ribs 51A, 51B.

The harness 45 is drawn out from an area in the vicinity of the regions where the screw through holes 57C, 57D are provided in the lower case 43.

In order to assemble the upper case 41 and the lower case 43 to each other, a screw is inserted into the screw through hole 57A and screwed into the screw hole 49 of the seating 47A. Likewise, a screw is inserted into the screw through hole 57B and screwed into the screw hole 49 of the seating 47B; a screw is inserted into the screw through hole 57C and screwed into the screw hole 49 of the seating 47C; and a screw is inserted into the screw through hole 57D and screwed into the screw hole 49 of the seating 47D.

As shown in FIGS. 6 and 8, the screw inserted into the screw through hole 57A is surrounded by the rib 51A when viewed horizontally from an outer circumference of the fan 29. The screw inserted into the screw through hole 57B is surrounded by the rib 51B when viewed horizontally from the outer circumference of the fan 29.

As shown in FIG. 6, when the upper case 41 and the lower case 43 are assembled to each other, a gap 59 exists between the upper case 41 and the lower case 43. The gap 59 has a height that corresponds to the heights of the seatings 47A, 47B, 47C, 47D.

As shown in FIG. 4, the mounting plate 31 is an approximately rectangular-shaped metal plate. The mounting plate 31 is secured by screw-fastening to an upper surface of the lower case 43. The mounting plate 31 comprises an opening 61 so as not to close the vent hole 39. The mounting plate 31 comprises two shaft supports 63 extending upwardly, one of which is provided in a left end in a front section of the mounting plate 31, and the other of which is provided in a right end in the front section of the mounting plate 31. The mounting plate 31 comprises a rail groove 65 in a rear section thereof.

As shown in FIG. 4, the mounting bracket 33 is a member formed of one piece of a metal plate. The mounting bracket 33 comprises a top panel 67, two side parts 69, and a side part 71. The two side parts 69 are formed such that left and right edges of the top panel 67 are bent to hang down. The side part 71 is formed such that a rear edge of the top panel 67 is bent to hang down.

Respective front sections of the two side parts 69 are disposed so as to overlap the two shaft supports 63 when viewed from the side. A shaft pin 73 penetrates through the two side parts 69 and the two shaft supports 63. An axial direction of the shaft pin 73 is parallel to the seat width direction. Thus, the mounting bracket 33 is rotatable about the shaft pin 73 with respect to the mounting plate 31. The shaft pin 73 corresponds to one example of a rotating shaft.

As shown in FIGS. 4 and 5, two mounting seats 75 are provided in a front section of the top panel 67. The mounting seat 75 has a shape of a base seat protruding upwardly. An upper surface 75A of the mounting seat 75 is flat.

As shown in FIGS. 2 and 5, the upper surface 75A abuts, from below, an underside 17A of the front panel 17 at a rear side of the front panel 17. The mounting seat 75 and the front panel 17 are secured to each other by screw-fastening. The upper surface 75A corresponds to one example of a mounting surface of the mounting bracket, and the underside 17A corresponds to one example of a mounting surface of the panel.

As shown in FIG. 4, between the two mounting seats 75, the top panel 67 comprises a hooking claw 77 formed by being cut and raised upwardly. As shown in FIGS. 1 and 5, the hooking claw 77 engages into an engagement hole 17B provided in the rear side of the front panel 17.

As shown in FIG. 4, an opening 79 is formed in a rear section of the top panel 67. The opening 79 is located above the vent hole 39 and the opening 61.

As shown in FIGS. 3 to 5, the hook 35 is formed to have a C-shaped cross section. The hook 35 is disposed to open toward the rear. As shown in FIG. 5, the hook 35 comprises an engagement piece 81 protruding downwardly on an underside of the hook 35. The engagement piece 81 is engaged with the rail groove 65, thereby attaching the hook 35 to the mounting plate 31. The hook 35 is slidable with respect to the mounting plate 31 in the front-rear direction.

As shown in FIG. 5, the hook 35 is externally fitted to the front pipe 19. The hook 35 is rotatable about a center axis of the front pipe 19. Accordingly, the air conditioning device 13 is also rotatable about the center axis of the front pipe 19.

As shown in FIGS. 3 to 5, the hook 35 comprises at least one protruding portion 83 (in the present embodiment, a plurality of protruding portions 83) on an abutment surface thereof to be abutted against the front pipe 19. Because the plurality of protruding portions 83 are provided, the contact area between the hook 35 and the front pipe 19 is reduced, thereby producing an effect that causes the hook 35 to rotate smoothly with respect to the front pipe 19.

As shown in FIGS. 4 and 5, the duct 37 is a tubular member made of rubber. The duct 37 is flexible. A lower end of the duct 37 is coupled to the vent hole 39 of the fan 29. An upper end of the duct 37 is coupled to a coupling opening (not shown) in an air-passage groove provided in the seat cushion 5.

As shown in FIG. 3, the duct 37 is inserted into the opening 79 of the mounting bracket 33. As shown in FIG. 4, the duct 37 comprises a constricted section 85. The constricted section 85 is constricted and narrower than upper and lower sections from the constricted section 85 in the duct 37. The mounting bracket 33 supports the duct 37 with the constricted section 85. For this reason, when the mounting bracket 33 is rotated with respect to the mounting plate 31, a portion of the duct 37 located in the vicinity of the constricted section 85 moves together with the mounting bracket 33.

As shown in FIGS. 3 to 5, the duct 37 comprises a holder 87 protruding rearward in a rear side of the duct 37. The holder 87 is a part of the duct 37. The holder 87 is located lower than the constricted section 85 in the up-down direction. The holder 87 is located at a side opposite to the shaft pin 73 when viewed from a main body of the duct 37 (i.e., the main body is a portion of the duct 37 excluding the holder 87). In an upper surface 87A of the holder 87, one protrusion 89 having a hemispherical shape is formed. A plurality of protrusions 89 may be provided. A portion of the upper surface 87A excluding the protrusion 89 is a flat surface.

In a state where the mounting seat 75 is not mounted to the underside 17A of the front panel 17, as shown in FIG. 5, the side part 71 of the mounting bracket 33 abuts, from above, the upper surface 87A. Consequently, the mounting bracket 33 is maintained at a specified position. In this case, the upper surface 75A of the mounting seat 75 is approximately parallel to the underside 17A. That is, the holder 87 abuts the side part 71, thereby maintaining the upper surface 75A and the underside 17A such that the upper surface 75A and the underside 17A are approximately parallel to each other. The abutment position of the side part 71 is located in a region forward of the protrusion 89 in the upper surface 87A.

2. Relationship Between Operation of Front Tilt Mechanism 7 and Operation of Air Conditioning Device 13

The front tilt mechanism 7 causes the two tilt arms 25 to rotate about the rotation shaft 27, thereby raising or lowering the front panel 17. The mounting seat 75 is secured to the front panel 17 and therefore, when the front panel 17 is raised or lowered, the mounting bracket 33 rotates about the shaft pin 73 in the raising-and-lowering direction of the mounting seat 75. In addition, the hook 35 rotates with respect to the front pipe 19.

Moreover, when the front panel 17 is raised or lowered, a distance between the front panel 17 and the front pipe 19 changes. A distance between the mounting seat 75 and the hook 35 is made to correspond to the distance between the front panel 17 and the front pipe 19 by causing the hook 35 to slide with respect to the mounting plate 31.

Accordingly, when the front tilt mechanism 7 is operated, a load is less likely to be applied to the mounting seat 75 and the hook 35 in the air conditioning device 13.

3. Effects Exhibited by Vehicle Seat 1

The vehicle seat 1 exhibits the following effects.

(1A) In the state where the mounting bracket 33 is not mounted to the front panel 17, the holder 87 abuts the side part 71 of the mounting bracket 33, thereby holding the upper surface 75A of the mounting seat 75 and the underside 17A of the front panel 17 such that the upper surface 75A and the underside 17A are approximately parallel to each other. Thus, the attachment work for attaching the mounting seat 75 to the front panel 17 is facilitated.

(1B) The holder 87 is a part of the duct 37 and is formed of rubber. Thus, damage to the side part 71 caused by the holder 87 can be inhibited.

(1C) The holder 87 is located at the side opposite to the shaft pin 73 when viewed from the main body of the duct 37. Thus, a greater distance exists between the holder 87 and the shaft pin 73. Consequently, the holder 87 achieves further accurate adjustment of the angle formed between the upper surface 75A and the underside 17A.

(1D) On the upper surface 87A of the holder 87, one protrusion 89 is provided. An operator can easily confirm whether the position of the holder 87 with respect to the side part 71 is appropriate based on the position of the protrusion 89 with respect to the side part 71.

(1E) The upper surface 87A of the holder 87 is to be abutted against the side part 71, and this upper surface 87A excluding the area of the protrusion 89 is a flat surface. Thus, the holder 87 can further securely hold the mounting bracket 33.

Other Embodiments

The embodiments for carrying out the present disclosure have been described; however, the present disclosure is not limited to the above-described embodiments and can be carried out in various modified modes.

(1) The holder may be provided, not in the duct 37, but in the mounting bracket 33. For example, the holder may be provided at a lower end of the side part 71. This holder abuts the duct 37, thereby holding the upper surface 75A and the underside 17A such that the upper surface 75A and the underside 17A are approximately parallel to each other.

Moreover, in addition to the holder 87 that is a part of the duct 37, a second holder may be provided in the mounting bracket 33. In this case, the holder 87 abuts the second holder and therefore, the upper surface 75A and the underside 17A are held approximately parallel to each other.

Furthermore, the holder 87 may not be a part of the duct 37 and may be a member mounted to the duct 37.

(2) The air conditioning device 13 may be mounted to the seatback 3. Also, the air conditioning device 13 may be mounted to each of the seat cushion 5 and the seatback 3.

(3) The holder 87 may be formed of materials other than rubber, and may be formed of, for example, resin, metal, ceramic, etc.

(4) The holder 87 may be provided in a front region of the duct 37.

(5) In the above-described embodiments, the vehicle seat 1 is employed in an automobile; however, the vehicle seat 1 may be employed in vehicles other than automobiles (for example, railroad vehicles, airplanes, ships, etc.).

(6) In each of the above-described embodiments, functions that one constituent element has may be divided among a plurality of constituent elements; alternatively, functions that a plurality of constituent elements have may be integrated to one constituent element. Moreover, a part of the configuration of each of the above-described embodiments may be omitted. Furthermore, at least a part of the configuration of each of the above-described embodiments may be added to, replaced with, etc. a configuration of another embodiment of the above-described embodiments. Any modes that are included in a technical idea specified by the languages in the claims are embodiments of the present disclosure.

What is claimed is:

1. A vehicle seat comprising:
   a seat body;
   a fan configured to blow air out or draw air in;
   a duct configured to couple between the seat body and the fan;
   a mounting bracket that is configured to be mounted to a panel provided in the seat body and that is configured to support the duct; and
   a holder that is provided in at least a first one of the duct and the mounting bracket, the holder being configured to be abutted against a second one of the duct and the mounting bracket in a state where the mounting bracket is not mounted to the panel, thereby holding a mounting surface of the mounting bracket and a mounting surface of the panel such that the mounting surface of the mounting bracket and the mounting surface of the panel are approximately parallel to each other.

2. The vehicle seat according to claim 1, wherein the holder is configured to be a part of the duct.

3. The vehicle seat according to claim 1, wherein the mounting bracket is rotatably mounted to the fan via a rotating shaft, and wherein the holder is provided at a side opposite to the rotating shaft when viewed from the duct.

4. The vehicle seat according to claim 1,
wherein the holder comprises at least one protrusion on a surface to be abutted against the second one of the duct and the mounting bracket.

5. The vehicle seat according to claim 1,
wherein at least a part of a surface of the holder that is to be abutted against the second one of the duct and the mounting bracket is a flat surface.

6. The vehicle seat according to claim 4,
wherein the at least one protrusion is provided in the holder at a position at which the at least one protrusion does not abut the second one of the duct and the mounting bracket.

7. The vehicle seat according to claim 1,
wherein the duct is flexible.

* * * * *